United States Patent
Wang

(10) Patent No.: US 6,220,107 B1
(45) Date of Patent: Apr. 24, 2001

(54) ECCENTRIC ORBITING TYPE SPEED CHANGING DEVICE

(75) Inventor: Hongyou Wang, Mie (JP)

(73) Assignee: Teijin Seiki Company, Limited, Mie (JP)

( * ) Notice: Subject to any disclaimer, the term of this patent is extended or adjusted under 35 U.S.C. 154(b) by 0 days.

(21) Appl. No.: 09/422,497

(22) Filed: Oct. 21, 1999

(30) Foreign Application Priority Data

Oct. 21, 1998 (JP) .................................................. 10-299294

(51) Int. Cl.[7] .................................................. F16H 29/04

(52) U.S. Cl. .................................................. 74/117; 74/116

(58) Field of Search ........................... 74/116, 117, 118, 74/119

(56) References Cited

U.S. PATENT DOCUMENTS

| 4,967,615 | * | 11/1990 | Mills | 74/117 |
| 5,226,859 | * | 7/1993 | Pires | 475/169 |
| 6,053,836 | * | 4/2000 | Mimura | 475/218 |
| 6,068,570 | * | 5/2000 | Han | 475/207 |

* cited by examiner

*Primary Examiner*—David Fenstermacher
(74) *Attorney, Agent, or Firm*—Akin, Gump, Strauss, Hauer & Feld, L.L.P.

(57) ABSTRACT

Since the phases of pinions 23, 25 and a pinion 24 are deviated by 180 degree, the pinions 23, 25 are acted with the engaging force which is reverse in a working direction to the engaging force of the pinion 24 and is half in the value. At this time since distances between a center 27a in the gear width of the pinion 24 and centers 26a, 28a in the gear width of the pinions 23, 25 are substantially equal, the engaging forces in the pinions 24 and 23, 25 are zero in resultant force and moment of rotation, and balanced.

8 Claims, 7 Drawing Sheets

FLAT FACE a

FLAT FACE b1   FLAT FACE b2

FLAT FACE a

FLAT FACE b1   FLAT FACE b2

ECCENTRIC ORBITING TYPE SPEED CHANGING DEVICE

BACKGROUND OF THE INVENTION

This invention relates to an eccentric orbiting type speed changing device for performing deceleration or acceleration by eccentrically rotating pinions or transmission disks.

As a conventional eccentric orbiting type planetary reduction gear device, for example, known is such a device comprising a casing having an internal gear at an inside periphery, two sheets of pinions held in the casing separately in an axial direction and defined on an outside periphery with external gears to be in mesh with the internal gear, a carrier having a pillar-like portion passing through the pinions in the axial direction, and an eccentric crank shaft causing these two sheets of pinions to eccentrically rotate under a condition of deviating phases thereof by 180 degree.

However, the conventional eccentric orbiting type planetary reduction gear device has a big problem generating large vibrations and noises.

An inventor of this patent application made earnest studies on mechanisms generating vibrations and noises in the eccentric orbiting type planetary reduction gear device, and came to the following findings. Namely, when the eccentric orbiting type planetary reduction gear device 11 reduces the speed as shown in FIGS. 7, 8 and 9, the gearing engagement in an X direction (tangential direction) as well as the gearing engagement in a Y direction (radius direction) act on respectively from the external gears of the pinions to the internal gear of the casing 12 by the rotation of the pinions 13, 14. Further, the pinions 13, 14 are respectively acted by the centrifugal force in the Y direction by the revolution thereof. At this time, the engaging forces Fx and Fy in the X and Y directions in the pinion 13 as well as the engaging forces −Fx and −Fy in the X and Y directions in the pinion 14 are equal in values, but the working directions are reverse, and the centrifugal forces P and −P in the Y direction in the pinions 13, 14 are equal values but the working directions are reverse. Consequently, the resultant force of the engaging forces in the X and Y directions and the resultant forth of the centrifugal force are made zero and balanced with respect to the force. Herein, it is presumed that the engaging force is a single force acting on center flat faces a, b in the gear width of the pinions 13, 14 in a maximum engaging parts of the pinions 13, 14 and the casing 12, and on the other hand it is presumed that the centrifugal force is a single force acting on the center of gravity of the pinions 13, 14. However, when observing the engaging forces Fy and −Fy in the Y axial direction and the centrifugal forces P and −P in the pinions 13, 14 on the flat faces including Y and Z axes together as shown in FIG. 10, both engaging forces Fy, −Fy and the centrifugal forces P, −P are separated by a distance L, and consequently couple of forces of Mf=Fy×L (moment of rotation) and couple of forces of Mp=P×L (moment of rotation) are created by both engaging forces Fy, −Fy and the centrifugal forces P, −P,, and accordingly the resultant force of the engaging force and the resultant forth of the centrifugal force are imbalanced with respect to the moment of rotation in the prior art. Since such moment of rotations (couple of forces) are imparted to a crank pin 15 and are gradually deviated toward a circumferential direction following eccentric rotations of the pinions 13, 14, the eccentric orbiting type planetary reduction gear device 11 is periodically vibrated to cause large vibrations and noises.

SUMMARY OF THE INVENTION

The invention has been realized based on such findings, and is to provide an eccentric orbiting type speed changing device capable of effectively suppressing vibrations and noises at deceleration and acceleration.

Such an object can be accomplished by firstly, the eccentric orbiting type speed changing gear device, comprising a casing having an internal gear at an inside periphery, three sheets of pinions held in the casing separately in an axial direction and defined on an outside periphery with external gears to be in mesh with the internal gear, a carrier having a pillar-like portion passing through the pinions in the axial direction, and an eccentric rotating means which causes one sheet of center pinion and two sheets of pinions positioned at both sides of said center pinion to perform eccentric rotations under a condition of deviating phases of said center pinion and both side pinions by 180 degree, and in which distances between a center line in the gear width of the center pinion and both center lines in the gear width of two sheets of both side pinions are substantially equal;

secondly, the eccentric orbiting type speed changing gear device, comprising a casing having an internal gear at an inside periphery, four sheets of pinions held in the casing and defined on an outside periphery with external gears to be in mesh with the internal gear, a carrier having a pillar-like portion passing through the pinions in the axial direction, and an eccentric rotating means which causes two sheets of center pinions of the same phases and two sheets of pinions of the same phases positioned at both sides of said center pinions to perform eccentric rotations under a condition of deviating phases of said center pinions and both side pinions by 180 degree, and in which distances between both center lines in the gear width of two sheets of center pinions and both center lines in the gear width of two sheets of both side pinions are substantially equal;

thirdly, the eccentric orbiting type speed changing device, comprising a cylindrical casing, three sheets of transmission disks held in the casing separately in an axial direction and outside peripheries thereof rolling-contacting an inside periphery of the casing and diameters thereof being smaller than an inner diameter of the casing, a carrier having a pillar-like portion passing through the transmission disks in the axial direction, and an eccentric rotating means which causes one sheet of center transmission disk and two sheets of transmission disks positioned at both sides of said center transmission disk and to perform eccentric rotations under a condition of deviating phases of said center transmission disk and both side transmission disks by 180 degree, and in which distances between a center line in the axial direction of the outside periphery of the center transmission disk and both center lines in the axial direction of the outside peripheries of two sheets of both side transmission disks are substantially equal; and fourthly, the eccentric orbiting type speed changing device, comprising a cylindrical casing, four sheets of transmission disks held in the casing separately in an axial direction and outside peripheries thereof rolling-contacting an inside periphery of the casing, and diameters thereof being smaller than an inner diameter of the casing, a carrier having a pillar-like portion passing through the transmission disks in the axial direction, and an eccentric rotating means which causes two sheets of center transmission disks of the same phases and two sheets of transmission disks of the same phases positioned at both sides of said center transmission disks to perform eccentric rotations under a condition of deviating phases of said center transmission disks and both side transmission disks by 180 degree, and in which distances between center lines in the axial direction of the outside peripheries of two sheets of center transmission disks and both center lines in the axial direction of the outside peripheries of two sheets of both side transmission disks are substantially equal.

When the speed reduction is carried out by the eccentric orbiting type speed changing gear device according to the first aspect of the invention, the pinions in mesh with the casing perform the eccentric rotation by an eccentric rotating means, and at this time, the gearing engagement in the Y axial direction (radius direction) acts on by the rotation of the pinions from the external gears of the pinions to the internal gear of the casing. Herein, since the pinions of three sheets are furnished and two sheets of both side pinions and one sheet of center pinion are deviated in phase by 180 degree, the engaging force Fy in the Y axial direction acts on the casing from the center pinion, while the engaging force $-\frac{1}{2}$Fy in the Y axial direction (the acting direction is reverse to Fy, and the value is half) acts on the casing from both side pinions. Then, since substantially equal are the distances between a center line in the gear width of the center pinion and both center lines in the gear width of two sheets of both side pinions, the gearing forces Fy and $-\frac{1}{2}$Fy of the center pinion and both side pinions are zero in the resultant force and moment of rotation and are balanced, resulting that couple of forces (moment of rotation) is not given to the eccentric rotating means by the engaging force in the Y axial direction, whereby vibrations and noises are effectively suppressed in the eccentric orbiting type speed changing gear device.

During the speed reduction as above, each of the pinions is acted with the centrifugal force in the Y axial direction due to the revolution of the pinions, but if the thicknesses of two sheets of both side pinions positioned is $\frac{1}{2}$ of that of the center pinion in accordance with the second aspect of the invention, the centrifugal force $-\frac{1}{2}$P respectively acting on both pinions is reverse in the acting direction to the centrifugal force P acting on the center pinion, and the value is $\frac{1}{2}$. As a result, the centrifugal forces $-\frac{1}{2}$P and P in the center and both side pinions are zero in the resultant force and the moment of rotation, and are balanced, so that vibrations and noises in the eccentric orbiting type speed changing gear device are more effectively suppressed.

In the eccentric orbiting type speed changing gear device according to the third aspect of the invention, the pinions of four sheets are furnished, while the two sheets of center pinions of the same phases as well as the two sheets of pinions of the same phases positioned at both sides of the center pinions are deviated by 180 degree with resect to the phase, and further substantially equal are the distances between both center lines in the gear width of two sheets of center pinions and both center lines in the gear width of two sheets of both side pinions, so that the engaging force Fy in the Y axial direction in the center pinions and the engaging force –Fy (the working direction is reverse to Fy, and the value is equal) in the Y axial direction in both side pinions are zero in the resultant force and the moment of rotation, and balanced together, whereby vibrations and noises are effectively suppressed in the eccentric orbiting type speed changing gear device.

In addition, according to the fourth aspect of the invention, the centrifugal force P in the Y axial direction generating in the center two pinions and the centrifugal force –P generating in both side two pinions are reverse in the working direction each other and the values are equal, so that the centrifugal forces are zero in the resultant force and the moment of rotation, and balanced together, whereby vibrations and noises are effectively suppressed in the eccentric orbiting type speed changing gear device.

In the eccentric orbiting type speed changing device according to the fifth aspect of the invention, there are furnished three sheets of the transmission disks rolling-contacting an inside periphery of the casing as the pinions of the first aspect of the invention, and sheets of transmission disks positioned at a center and two sheets of transmission disks positioned at both sides of the center transmission disk are deviated by 180 degree with respect to the phase, and further substantially equal are the distances between a center line in the axial direction of the outside periphery of the center transmission disk and both center lines in the axial direction of the outside peripheries of two sheets of both side transmission disks, so that similarly to the first aspect of the invention, the friction force Fy in the Y axial direction in the center transmission disk and the friction force –Fy in the Y axial directions of both side transmission disks (the working force is reverse to Fy, and the value is half) are zero in the resultant force and the moment of rotation, and balanced together, whereby vibrations and noises are effectively suppressed in the eccentric orbiting type speed changing device.

As disclosed in the sixth aspect of the invention, if the thickness of two sheets of transmission disks positioned at both sides is $\frac{1}{2}$ of that of the center transmission disk, similarly to the second aspect, the centrifugal forces $-\frac{1}{2}$P and P in the center and both side transmission disks are zero in the resultant force and the moment of rotation, and are balanced, so that vibrations and noises in the eccentric orbiting type speed changing device are more effectively suppressed.

Also in the eccentric orbiting type speed changing device according to the seventh aspect of the invention, similarly to the third aspect, the friction force Fy in the Y axial direction in the center transmission disk and the friction force –Fy in the Y axial directions of both side transmission disks (the working force is reverse to Fy, and the value is half) are zero in the resultant force and the moment of rotation, and balanced together, whereby vibrations and noises are effectively suppressed in the eccentric orbiting type speed changing device.

In the eccentric orbiting type speed changing device of the eighth aspect of the invention, the centrifugal force P in the Y axial direction generating in the center two transmission disks and the centrifugal force –P generating in both side two transmission disks are reverse in the working direction and the values are equal, so that the centrifugal forces are zero in the resultant force and the moment of rotation, and balanced together, whereby vibrations and noises are effectively suppressed in the eccentric orbiting type speed changing device.

The term "substantially equal" used in this application is intended to encompass not only a case where the distances are exactly or accurately equal but also a case where the distances are slightly different from each other as far as vibrations and noises are effectively suppressed.

The present disclosure relates to the subject matter contained in Japanese patent application No. Hei. 10-299294 (filed on Oct. 21, 1998), which is expressly incorporated herein by reference in its entirety.

BRIEF DESCRIPTION OF THE DRAWINGS

In the accompanying drawings:

FIG. 8 is an explanatory view for explaining working condition of force in a flat face a;

DESCRIPTION OF THE PREFERRED EMBODIMENT

A first embodiment of the invention will be explained in accordance with the attached drawings.

Figure 1:
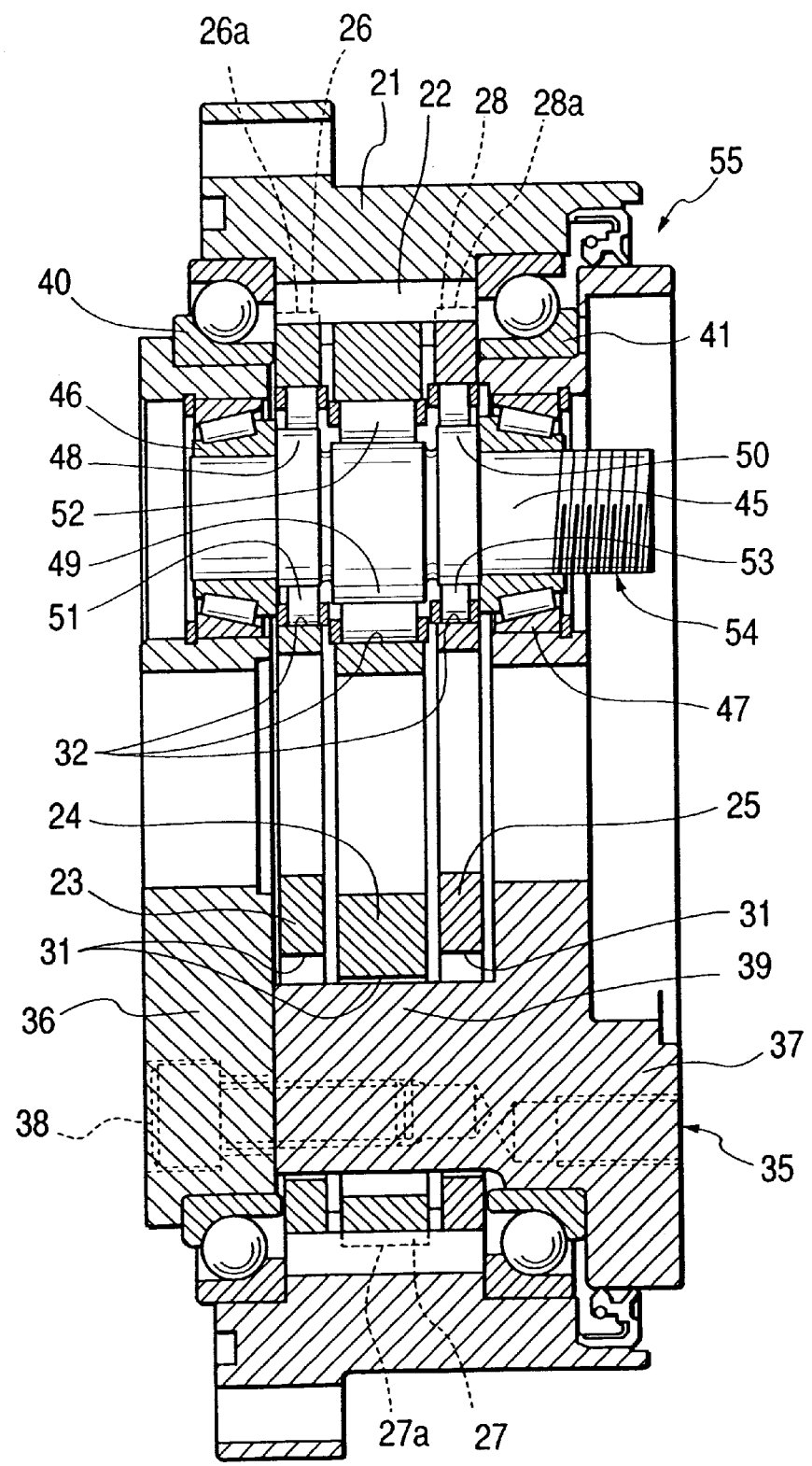
FIG. 1 is a front view showing a first embodiment of the invention.

In FIG. 1, a numeral 21 designates an almost cylindrical and rotatable casing. In an inner periphery of the casing 21 and at the center in the axial direction thereof, many number of internal gear pins 22 composing an interior gear are fixed under a condition that the internal gear pins are inserted almost by half, and these internal gear pins 22 axially extend while separating equidistantly and peripherally. In the casing 21, three pieces of disk-like pinions 23, 24, 25 are held, and at the outer peripheries of the respective pinions 23, 24, 25, exterior gears 26, 27, 28 are formed over full width, number of which is less than that of the internal gear pins 22 (in this embodiment, the number is fewer by one piece). Two sheets of pinions 23, 25 positioned at both sides have thickness of ½ of that of the center pinion 24. The external gears 26, 27, 28 of the pinions 23, 24, 25 are engaged with the internal gear 22 of the casing 21. The maximum engaging portions (the innermost portions of the gearing engagement) are of the same phase in both side pinions 23, 25, but in the center pinion 24, the phases are deviated by 180 degree from the maximum engaging portions of both pinions 23, 25. These three sheets of pinions 23, 24, 25 are equidistantly separated in the axial direction, and consequently substantially equal are the distances in the axial directions from the center 27a in the gear width of the external gear 27 of the pinion 24 centrally positioned to the centers 26a, 28a in the gear width of the external gears 26, 28 of the two sheets of both side pinions 23, 25. In the interiors of the pinions 23, 24, 25, three penetrating holes 32 are formed separately equidistantly from the center axis between at least one playing hole 31 (herein three playing holes separating equidistantly in the circumferential direction) and an adjacent playing hole 31. Numeral 35 designates a carrier secured to a securing member (not shown) held in the casing 21. The carrier 35 comprises a pair of disk shaped edge plates 36, 37 and a pillar-like portion 39 detachably connected at its one end to the edge plate 36 via plural bolts 38 and integrally connected at the other end to the edge plate 37. The pillar-like portion 39 connecting the edge plates 36, 37 extends in the axial direction and idly goes through the playing hole 31 of the pinions 23, 24, 25. Numerals 40, 41 are bearings interposed between the outside peripheries of the edge plates 36, 37 and the inside periphery of the casing 21, and by these bearings 40, 41, the casing 21 is rotatably supported to the carrier 35.

Numeral 45 designates crank pins of the same number as the penetrating holes. The crank pin 45 is rotatably supported at its edge part to the edge plate 36 via the bearing 46, and at the other edge part to the edge plate 37 via the bearing 47. Each of the crank pins 45 has three eccentric portions 48, 49, 50 being eccentric by equidistant spaces from the central shaft of the crank pin 45, and both side eccentric portions 48, 50 are of the same phase while the center eccentric portion 49 is deviated by 180 degree in the phase from the eccentric portions 48, 50. The eccentric portions 48, 49, 50 are inserted in the penetrating holes 32 of the pinions 23, 24, 25 under conditions of interposing roller bearings 51, 52, 53 in the penetrating holes 32. When the crank pins 45 are given to other ends thereof rotation of equal speed in the same direction from a motor (not shown) and are rotated around the center shaft, the eccentric portions 48, 49, 50 are eccentrically rotated in the penetrating holes 32 so as to eccentrically rotate (revolution) the pinions 23, 25 and the pinion 24 under the condition of deviating the phases by 180 degree. Then, the number of the internal gear pins 22 and the number of the external gears 26, 27, 28 are different a thought (herein, the number of the external gears 26, 27, 28 is less by one than the number of the internal gear pins 22), so that the casing 21 is rotated at low speed by the eccentric rotation of the pinions 23, 24, 25. The motor and the crank pins 45 compose as a whole an eccentric rotating means 54 which eccentrically rotates two sheets of pinions 23, 25 positioned at both sides and one sheet of pinion 24 by deviating the phases 180 degree.

Next, reference will be made to a first embodiment of the invention.

For performing the speed reduction by means of the eccentric orbiting type speed changing gear device 55, the motor (not shown) is worked to rotate all of the crank pins 45 around the center shafts in the same direction at the same speed. As a result, the eccentric portions 48, 49, 50 of the crank pins 45 eccentrically rotate in the penetrating holes 32 of the pinions 23, 24, 25, and eccentrically rotate the pinions 23, 24, 25 (revolution), but since the number of the external gears 26, 27, 28 is less than the number of the internal gear pins 11, the rotation of the crank pins 45 is decelerated at high ratio and is transmitted to the casing 21 to rotate this casing at low speed.

Figure 2:
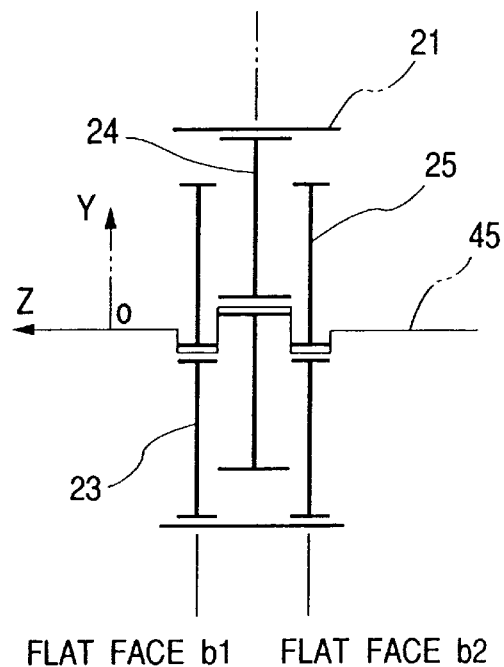
FIG. 2 is a skeletal cross sectional view of the same.
Figure 3:
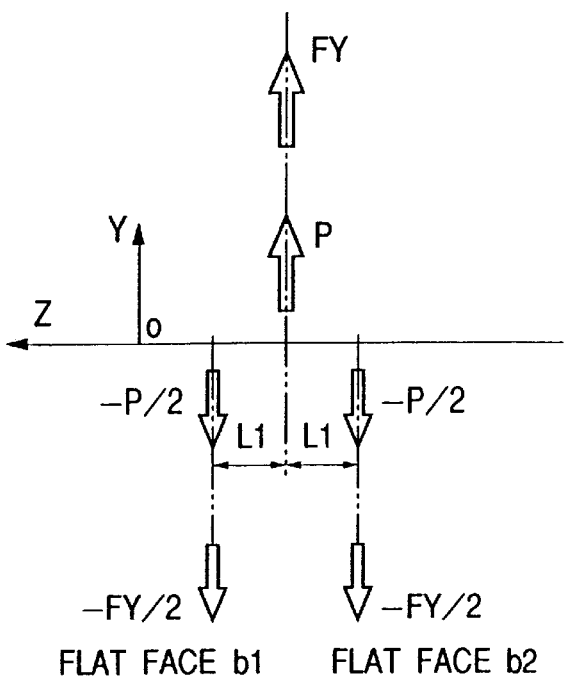
FIG. 3 is an explanatory view for explaining working condition of force.

While executing the speed reduction, the internal gear pin 22 of the casing 21 is, as shown in FIGS. 2 and 3, acted with the engaging force in the Y direction (radius direction) by rotation of the pinions 23, 24, 25 from the external gears 26, 27, 28 of the pinions 23, 24, 25, and acted with the centrifugal force in the Y direction by revolution of the pinions 23, 24, 25. Since the pinions of three sheets are furnished, and both side two pinions 23, 25 and the center one pinion 24 are deviated in the phase by 180 degree, the casing 21 is acted with the engaging force Fy exerting in the Y direction from the center pinion 24, and is acted with the engaging force −½Fy (the working direction is reverse to Fy and the value is half) exerting in the Y direction from both side pinions 23, 25, but at this time since the distances L1 from the center 27a in the gear width of the center pinion 24 to the centers 26a, 28a in the gear width of both side two pinions 23, 25 are substantially equal, the engaging forces Fy and −½Fy in the center and both side pinions 24 and 23, 25 are zero in the resultant force and the moment of rotation, and balanced. As a result, couple of forces (moment of rotation) is not given to the crank pins 45 by the engaging force in the Y axial direction, so that vibrations and noises are effectively suppressed in the eccentric orbiting type speed changing gear device. On the other hand, the value acting on the pinions 23, 24, 25 is P in the center pinion 24, but −½P (the working direction is reverse to P and the value is half) in the pinions 23, 25 which are ½ in thickness of the pinion 24, and therefore the centrifugal forces P and −½P in the center and both side pinions 24 and 23, 25 are zero in the resultant force and the moment of rotation. As a result, couple of forces (moment of rotation) is not given to the crank pin 45 by the centrifugal force, so that vibrations and noises are more effectively suppressed in the eccentric orbiting type speed changing gear device 55. Herein, assuming that the engaging force therebetween is a single force acting on the center flat surfaces a, b1, b2 in the gear width of the pinions 23, 24, 25 in the maximum gearing engagement between the pinions 23, 24, 25 and the casing 21, the centrifugal force is assumed to be a single force acting on center of gravity of the pinions 23, 24, 25.

Figure 4:
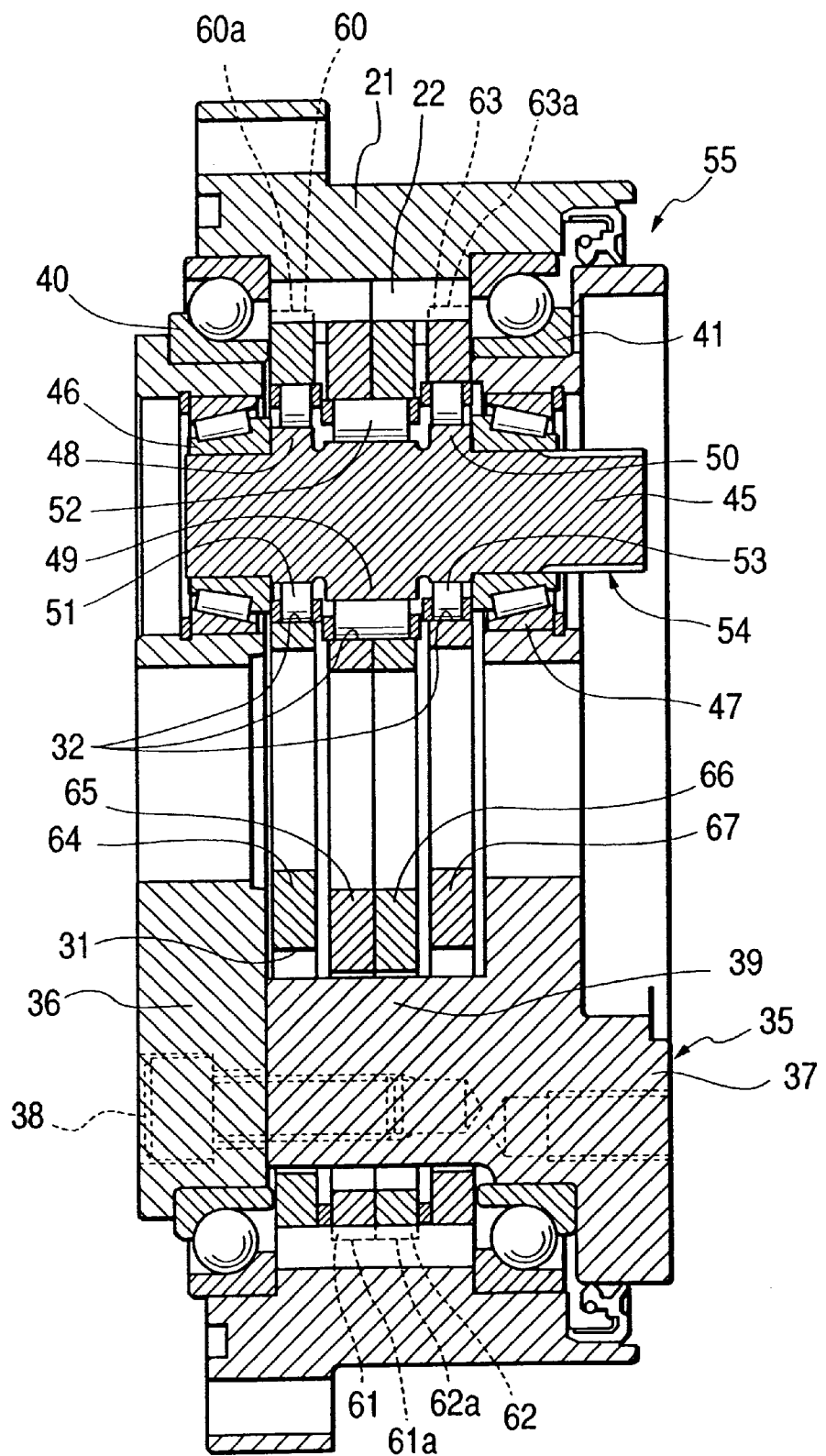
FIG. 4 is a front view showing a second embodiment of the invention.

FIG. 4 shows a second embodiment of the invention. In this embodiment, there are held in the casing 21 four sheets of pinions 64, 65, 66, 67 of the same thickness having respective external gears 60, 61, 62, 63 tobe inmeshwith the internal gear 22. Phases of the two sheets of pinions 64, 67 positioned at both sides are equal, while phases of the two sheets of pinions 65, 66 positioned at the center are equal, and the phases of the pinions 64, 67 and the phases of the pinions 65, 66 are deviated by 180 degree. Further, distances between centers 61a, 62a in gear width of external gears 61, 62 of the center pinions 65, 66 and centers 60a, 63a in gear width of external gears 60, 63 of the both side pinions 64, 67 are substantially equal. The pinions 64, 65, 66, 67 are easily manufactured by using four sheets of pinions of the same thickness. Other composing elements are the same as those of the first embodiment.

Also in this second embodiment, the engaging force Fy in the Y axial direction in the center pinions 65, 66 and the gearing force −Fy (the working direction is reverse to Fy and the value is equal) in the Y axial direction in the both side pinions 64, 67 are zero in resultant force and moment of rotation, so that vibrations and noises are effectively suppressed in the eccentric orbiting type speed changing gear device. Further, since all the pinions 64, 65, 66, 67 have the same thickness, the centrifugal force P in the Y axial direction generating in the center pinions 65, 66 and the centrifugal force −P in the Y direction generating in both side pinions 64, 67 are reverse in the working direction and equal in the value, and as a result these centrifugal forces are zero in resultant force and moment of rotation, so that vibrations and noises are more effectively suppressed in the eccentric orbiting type speed changing gear device 55. Other actions are the same in the first embodiment. Herein, the two sheets of center pinions 65, 66 may be connected to be unitary, and in this case, the engaging force and the centrifugal force are the same as explained in the first embodiment.

Figure 5:
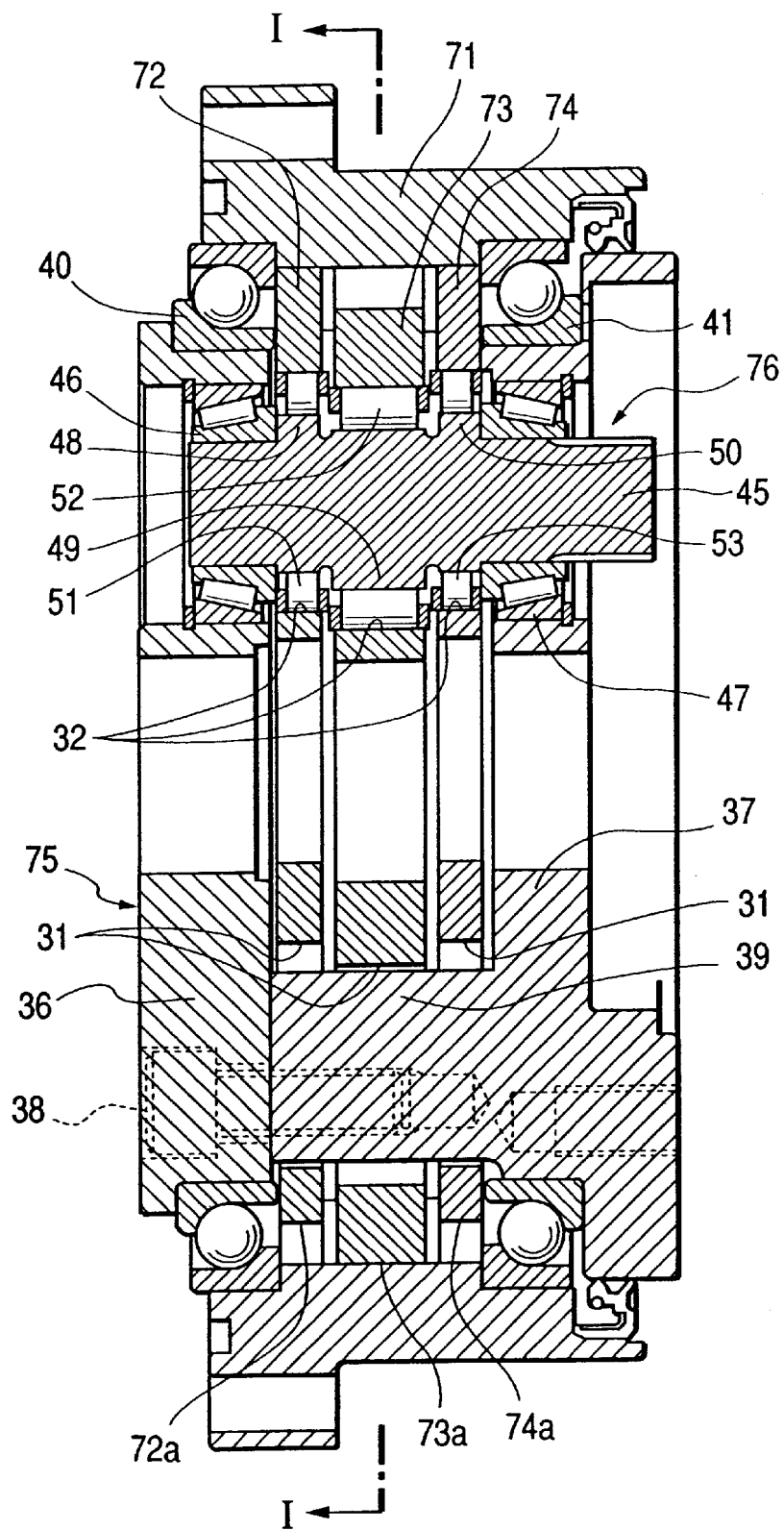
FIG. 5 is a front view showing a third embodiment of the invention.
Figure 6:
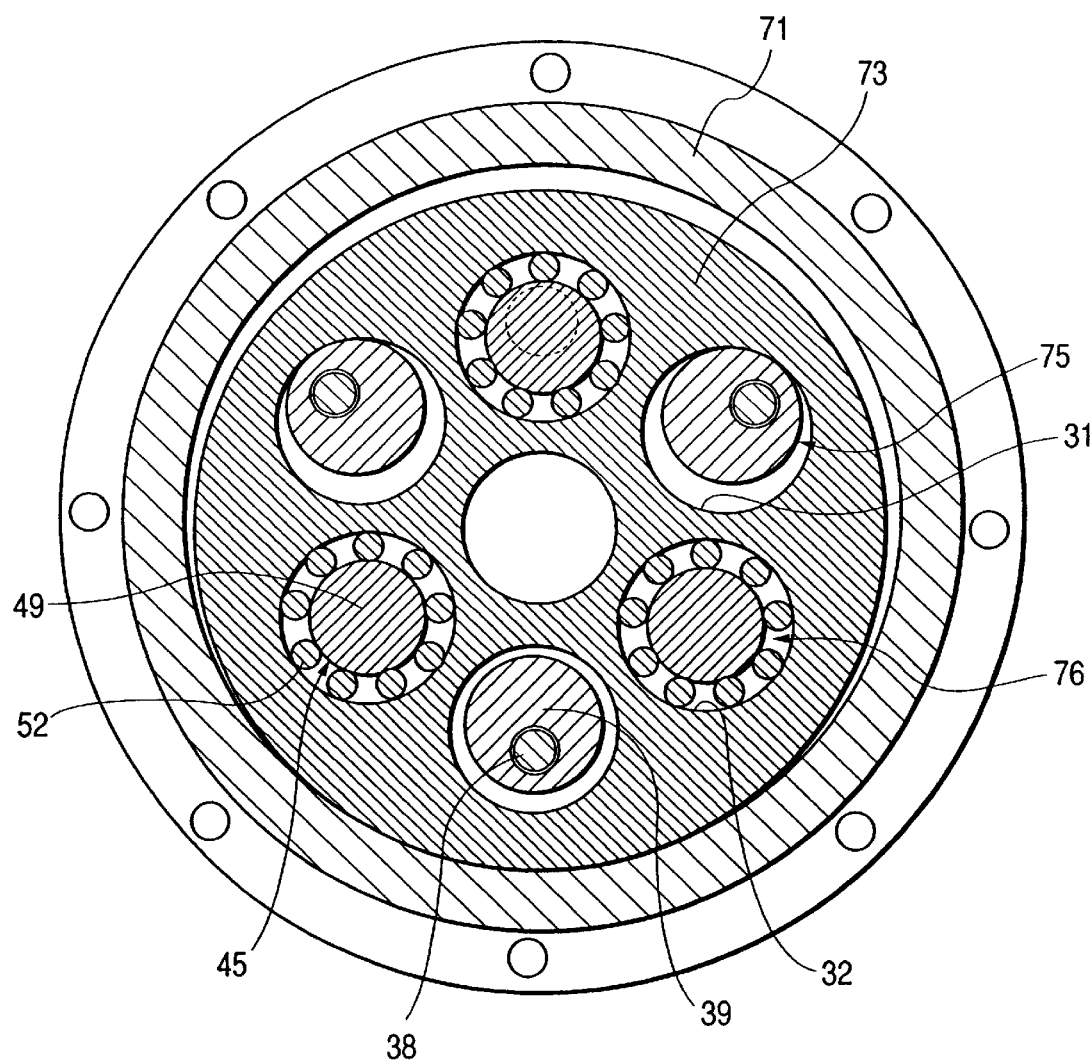
FIG. 6 is a cross sectional view seen from I—I arrows of FIG. 5.
Figure 7:
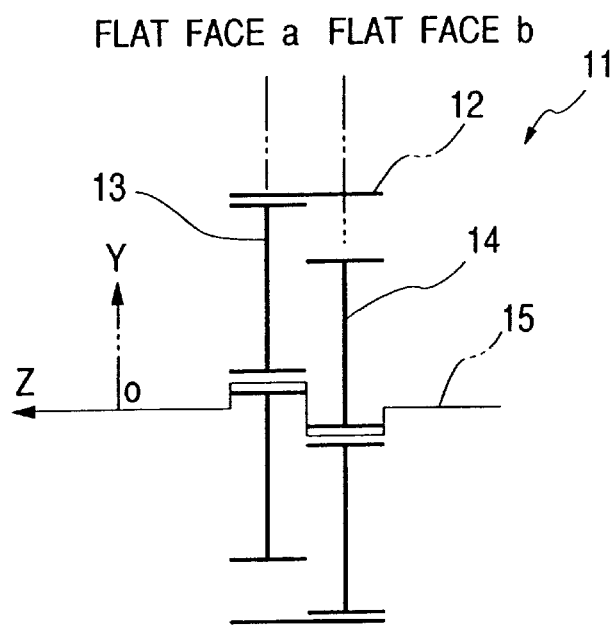
FIG. 7 is a skeletal cross sectional view showing one embodiment of a conventional eccentric orbiting type speed changing device.
Figure 8:
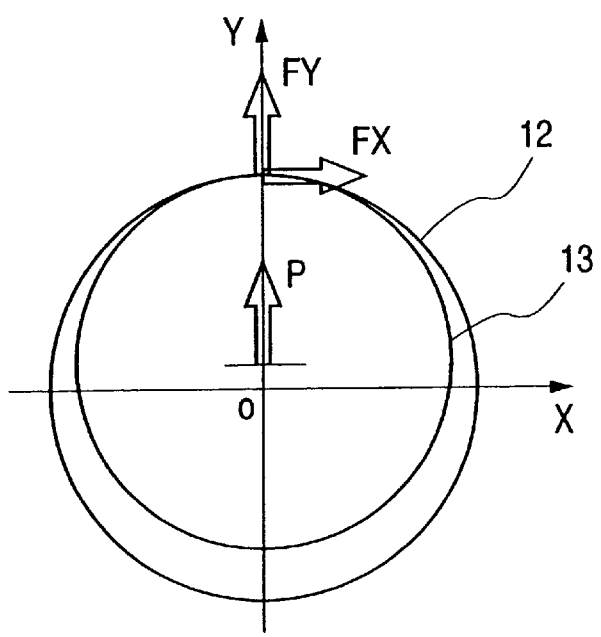
Figure 9:
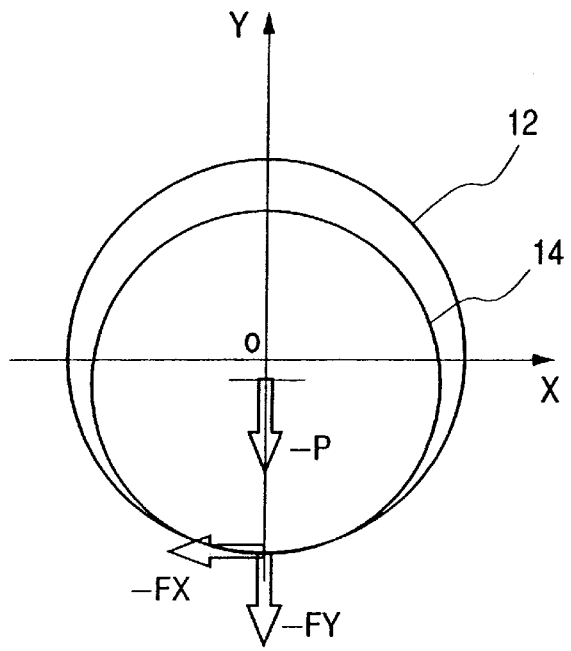
FIG. 9 is an explanatory view for explaining working condition of force in a flat face b.
Figure 10:
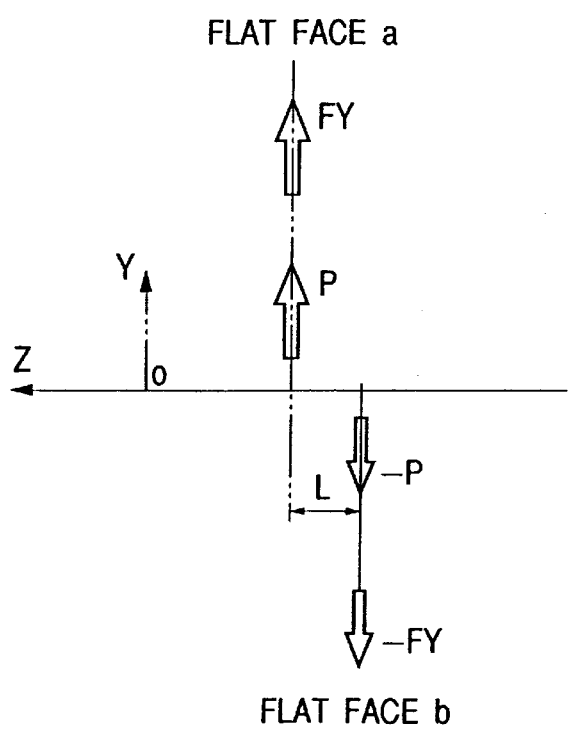
FIG. 10 is an explanatory view for explaining working condition of force.

FIGS. 5 and 6 show a third embodiment. In this embodiment, an internal gear is not held in an inside periphery of a casing 71, and consequently, the casing 71 is cylindrical. In the casing 71, there are not held pinions defined with external gears in the outside periphery but held three sheets of transmission disks 72, 73, 74 separately in the axial direction, outer diameters of which are smaller than an inner diameter of the casing 71. Distances between a center 73a in the axial direction of the outside periphery of the center transmission disk 73 and centers 72a, 74a in the axial direction of the outside periphery of both side two transmission disks 72, 74 are substantially equal. The thicknesses of both side two transmission disks 72, 74 are ½ of the thickness of the center transmission disk 73. Herein, the outside peripheries of these transmission disks 72, 73, 74 rolling-contact the inside periphery at one position, and the contacting points are at the equal phase in the both side two transmission disks 72, 74, but the contacting point of the center one transmission disk is deviated by 180 degree from those of the both side transmission disks 72, 74. Also in this embodiment, there are provided a carrier 75 having a pillar portion passing through the transmission disks 72, 73, 74 in the axial direction and an eccentric rotating means 76 eccentrically rotating both side two transmission disks 72, 74 and the center transmission disk 73 under deviating the phases thereof by 180 degree. The carrier 75 and the eccentric rotating means 76 are of the same structure as the already mentioned carrier 35 and eccentric rotating means 54, and therefore the same numerals are given to the same parts for omitting detailed explanations.

When the transmission disks 72, 73, 74 are eccentrically rotated by the crank pin 45 in the above mentioned structure, the outside peripheries of the transmission disks 72, 73, 74 and the inside periphery of the casing 71 are rolling-contacted. Then, as the length of the outside peripheries of the disks 72, 73, 74 is shorter than the length of the inside periphery of the casing 71, rotation is given to the casing 71 from the disks 72, 73, 74 by friction resistance due to the difference in length of the peripheries, so that the casing 71 is rotated at low speed. The rotation thus input in the crank pin 45 is decelerated by the casing 71 and the disks 72, 73, 74, and thereafter it is output from the casing 71. The friction force Fy in the Y axial direction in the center disk 73 and the friction force −Fy (the working direction is reverse to Fy and the value is ½)in the Y axial direction in the both side disks 72, 74 are zero in resultant force and moment of rotation, so that vibrations and noises are effectively suppressed in the eccentric orbiting type speed changing device.

Further, as the thicknesses of both side two transmission disks 72, 74 are ½ of the thickness of the center transmission disk 73, similarly to the first embodiment, the centrifugal forces −½P and P in the Y axial direction in both side disks 72, 74 and the center disk 73 are zero in resultant force and moment of rotation and are balanced, so that vibrations and noises are effectively suppressed in the eccentric orbiting type speed changing device.

Similarly to the second embodiment, there are held in the casing 71 four sheets of transmission disks, and phases of two sheets of disks positioned at both sides and phases of two sheets of disks positioned at the center are equal, and the former phases and the latter phases are deviated by 180 degree. In addition, distances between centers in the axial direction of the outside peripheries of center two disks and centers in the axial direction of the outside peripheries of both side disks may be substantially equal. In such a way, the same working and effects are available as in the second embodiment. Then, all thicknesses of the transmission disks may be substantially equal, and also in this case, the same working and effects in the second embodiment are available.

In the aforementioned embodiments, the carrier 35 is fixed, the casing 21 is turnable, and the rotation input in the crank pin 45 is decelerated by the pinions 23, 24, 25 and output into the casing 21. In the invention, it may be permitted that the casing is fixed, the carrier is turnable, and the rotation input in the crank pin is decelerated by the pinions and the transmission disks and output into the carrier. In addition, in the above embodiments, the pinions 23, 24, 25 are defined with a plurality of penetrating holes 32 separated equidistantly from the center axes of the pinions 23, 24, 25, and the eccentric portions 48, 49, 50 of the crank pins 45 are inserted in the penetrating holes 32, and when the crank pins 45 are turned, the pinions 23, 24, 25 are eccentrically turned. In this invention, it is permitted that the pinions and the transmission disks are defined with penetrating holes in central lines thereof, and the penetrating holes are inserted with eccentric portions of the crank shafts, and when the crank shaft are turned, the pinions and the transmission disks are eccentrically turned. In this case, the pillar portions of the carriers are contacted at one position to the inside peripheries of the playing holes of the transmission disks, so that self-rotations of the pinions and transmission disks are sent to the carriers. Further, in the above mentioned embodiments, the rotation input in the crank pin 45 is decelerated and taken out from the casing 21 or the carrier 35. In the invention, it is permitted that the rotation input in the casing or the carrier is accelerated and taken out from the crank pin and the crank shaft. It is also permitted that, for example, a pre-step speed reducer composed of plural spur gears are connected to input terminals of the crank pins or crank shaft, and after reducing the input rotation by the pre-step speed reducer, the decelerated rotation is input in the cranks pin or the crank shaft.

According to the invention, as seen vibrations and noises can be effectively suppressed at speed deceleration and acceleration.

What is claimed is:

1. An eccentric orbiting type speed changing gear device, comprising:

a casing having an internal gear at an inside periphery, three sheets of pinions held in the casing separately in an axial direction and formed on outside peripheries with external gears to be in mesh with the internal gear;

a carrier having a pillar-like portion passing through the pinions in the axial direction; and an eccentric rotating means which causes one sheet of center pinion and two sheets of pinions positioned at both sides of said center pinion to perform eccentric rotations under a condition of deviating phases of said center pinion and both side pinions by 180 degree, wherein distances between a center line in the gear width of the center pinion and both center lines in the gear width of two sheets of both side pinions are substantially equal.

2. An eccentric orbiting type speed changing gear device as set forth in claim 1, wherein thickness of two sheets of both side pinions is ½ of that of the center pinion.

3. An eccentric orbiting type speed changing gear device, comprising:

a casing having an internal gear at an inside periphery;

four sheets of pinions held in the casing and formed on outside peripheries with external gears to be in mesh with the internal gear;

a carrier having a pillar-like portion passing through the pinions in the axial direction; and an eccentric rotating means which causes two sheets of center pinions of the same phases and two sheets of pinions of the same phases positioned at both sides of said center pinions to perform eccentric rotations under a condition of deviating phases of said center pinions and both side pinions by 180 degree, wherein distances between both center lines in the gear width of two sheets of center pinions and both center lines in the gear width of two sheets of both side pinions are substantially equal.

4. An eccentric orbiting type speed changing gear device as set forth in claim 3, wherein thicknesses of four sheets of pinions are all equal.

5. An eccentric orbiting type speed changing device, comprising:

a cylindrical casing;

three sheets of transmission disks held in the casing separately in an axial direction, outside peripheries of the transmission disks rolling-contacting an inside periphery of the casing, and diameters of the transmission disks being smaller than an inner diameter of the casing;

a carrier having a pillar-like portion passing through the transmission disks in the axial direction; and an eccentric rotating means which causes one sheet of center transmission disk and two sheets of transmission disks positioned at both sides of said center transmission disk to perform eccentric rotations under a condition of deviating phases of said center transmission disk and both side transmission disks by 180 degree, wherein distances between a center line in the axial direction of the outside periphery of the center transmission disk and both center lines in the axial direction of the outside peripheries of two sheets of both side transmission disks are substantially equal.

6. An eccentric orbiting type speed changing device as set forth in claim 5, wherein thickness of two sheets of both side transmission disks is ½ of that of the center transmission disk.

7. An eccentric orbiting type speed changing device, comprising:

a cylindrical casing;

four sheets of transmission disks held in the casing, outside peripheries of the transmission disks rolling-contacting an inside periphery of the casing, and diameters of the transmission gears being smaller than an inner diameter of the casing;

a carrier having a pillar-like portion passing through the transmission disks in the axial direction; and an eccentric rotating means which causes two sheets of center transmission disks of the same phases and two sheets of transmission disks of the same phases positioned at both sides of said center transmission disks to perform eccentric rotations under a condition of deviating phases of said center transmission disks and both side transmission disks by 180 degree, wherein distances between center lines in the axial direction of the outside peripheries of two sheets of center transmission disks and both center lines in the axial direction of the outside peripheries of two sheets of both side transmission disks are substantially equal.

8. An eccentric orbiting type speed changing device as set forth in claim 7, wherein thicknesses of four sheets of transmission disks are all equal.

* * * * *